US012607984B2

(12) United States Patent
Okamoto et al.

(10) Patent No.: US 12,607,984 B2
(45) Date of Patent: Apr. 21, 2026

(54) DISPLAY DEVICE DISPLAYING SURFACE ROUGHNESS OF WORKPIECE

(71) Applicant: FANUC CORPORATION, Yamanashi (JP)

(72) Inventors: Daichi Okamoto, Yamanashi (JP); Masashi Yasuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 377 days.

(21) Appl. No.: 18/261,234

(22) PCT Filed: Jan. 25, 2022

(86) PCT No.: PCT/JP2022/002613
§ 371 (c)(1),
(2) Date: Jul. 12, 2023

(87) PCT Pub. No.: WO2022/163634
PCT Pub. Date: Aug. 4, 2022

(65) Prior Publication Data
US 2024/0069528 A1 Feb. 29, 2024

(30) Foreign Application Priority Data
Jan. 28, 2021 (JP) ................................. 2021-011955

(51) Int. Cl.
*G05B 19/416* (2006.01)
*G05B 19/23* (2006.01)
(52) U.S. Cl.
CPC ........... *G05B 19/416* (2013.01); *G05B 19/23* (2013.01); *G05B 2219/35312* (2013.01); *G05B 2219/37402* (2013.01)

(58) Field of Classification Search
None
See application file for complete search history.

(56) References Cited

U.S. PATENT DOCUMENTS

2020/0192333 A1* 6/2020 Sato ................... G05B 19/4069

FOREIGN PATENT DOCUMENTS

| CN | 104062941 A | 9/2014 |
| JP | 2019-191857 A | 10/2019 |

(Continued)

OTHER PUBLICATIONS

International Search Report issued in PCT/JP2022/002613; mailed Apr. 19, 2022.

*Primary Examiner* — Ryan A Jarrett
(74) *Attorney, Agent, or Firm* — Studebaker Brackett PLLC

(57) ABSTRACT

Provided is a display device and a computer program with which it is possible to easily confirm the surface roughness of a workpiece during a turning process. The display device comprises: a surface roughness calculation unit for calculating data pertaining to the surface roughness of a workpiece during a turning process in which the feeding speed for relative cutting between the workpiece and equipment changes, on the basis of the feeding speed in the feeding direction for the relative cutting between the workpiece and the equipment and the shape of the equipment; and a display control unit for performing control, on the basis of the calculated data pertaining to the surface roughness and a display configuration that was configured in advance, such that the data pertaining to the surface roughness of the workpiece is displayed on a display unit.

4 Claims, 5 Drawing Sheets

(56) References Cited

FOREIGN PATENT DOCUMENTS

| JP | 6674076 B1 | 4/2020 |
| WO | 2018/117203 A1 | 6/2018 |

* cited by examiner

FIG. 5

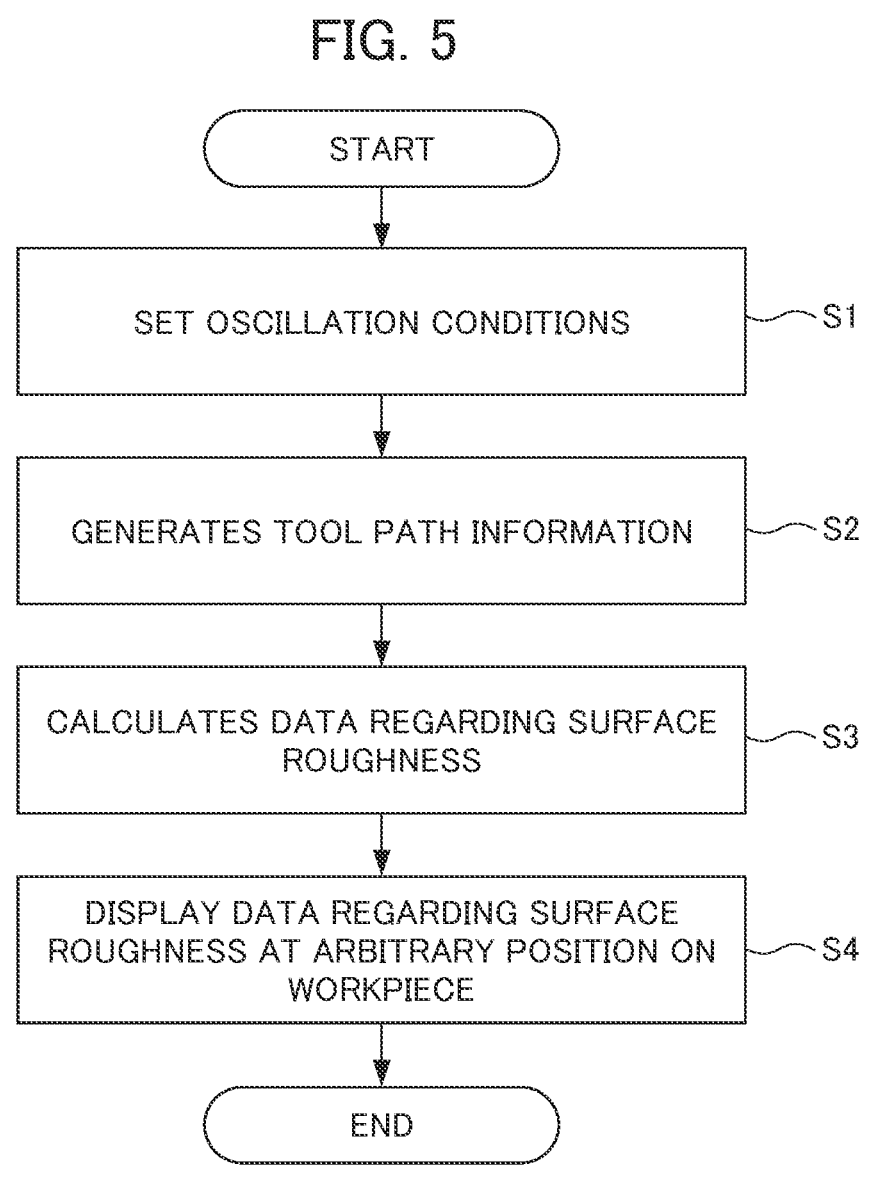

START

SET OSCILLATION CONDITIONS — S1

GENERATES TOOL PATH INFORMATION — S2

CALCULATES DATA REGARDING SURFACE ROUGHNESS — S3

DISPLAY DATA REGARDING SURFACE ROUGHNESS AT ARBITRARY POSITION ON WORKPIECE — S4

END

DISPLAY DEVICE DISPLAYING SURFACE ROUGHNESS OF WORKPIECE

TECHNICAL FIELD

The present invention relates to a display device and a computer program.

BACKGROUND ART

In relation to oscillation-cutting, in which a workpiece is cut by a cutting tool while the workpiece and the cutting tool are fed in a machining direction and are relatively reciprocally vibrated at the same time, a technique has been disclosed in which a machining path is graphically displayed in response to selection of a spindle rotation number and an oscillation frequency for setting of oscillation conditions (see, for example, Patent Document 1). It is well known in the known art that when cutting intervals are constant, a surface roughness of a workpiece can be calculated from a tool shape and a feed speed.

Patent Document 1: PCT International Publication No. WO2018/117203

DISCLOSURE OF THE INVENTION

Problems to be Solved by the Invention

Turning, such as oscillation-cutting, involves a change in cutting intervals, whereby surface roughness varies depending on positions on a workpiece. While disclosing displaying a machining path for oscillation-cutting, the known art does not make it possible to easily check which portion of a workpiece will have what level of surface roughness or what level of surface roughness the entire workpiece will have. For this reason, it is difficult to discuss what oscillation conditions should be set in order to improve the machining quality associated with surface roughness. That is, there is a demand for a display device that makes it easy to check surface roughness that a workpiece will have in the case of the turning.

Means for Solving the Problems

An aspect of the present disclosure is directed to a display device including: a surface roughness calculation unit configured to calculate, for turning in which a relative cutting feed speed between a workpiece and a tool changes, data regarding surface roughness of the workpiece, based on a feed speed along a relative cutting feed direction for the workpiece and the tool and a shape of the tool; and a display control unit configured to control and cause a display unit to display data regarding the surface roughness of the workpiece, based on the calculated data regarding the surface roughness and a preset display setting.

An aspect of the present disclosure is directed to a computer program for causing a computer to perform operations that comprise: for turning in which a relative cutting feed speed between a workpiece and a tool changes, calculating data regarding surface roughness of the workpiece, based on a feed speed along a relative cutting feed direction for the workpiece and the tool and a shape of the tool; and controlling and causing a display unit to display data regarding the surface roughness at an arbitrary designated position on the workpiece, based on the calculated data regarding the surface roughness and a preset display setting.

Effects of the Invention

The present invention makes it possible to easily check surface roughness that a workpiece will have in the case of the turning.

BRIEF DESCRIPTION OF THE DRAWINGS

FIG. 5 is a flowchart illustrating a flow of process performed by the display device according to the present embodiment.

PREFERRED MODE FOR CARRYING OUT THE INVENTION

Figure 1:
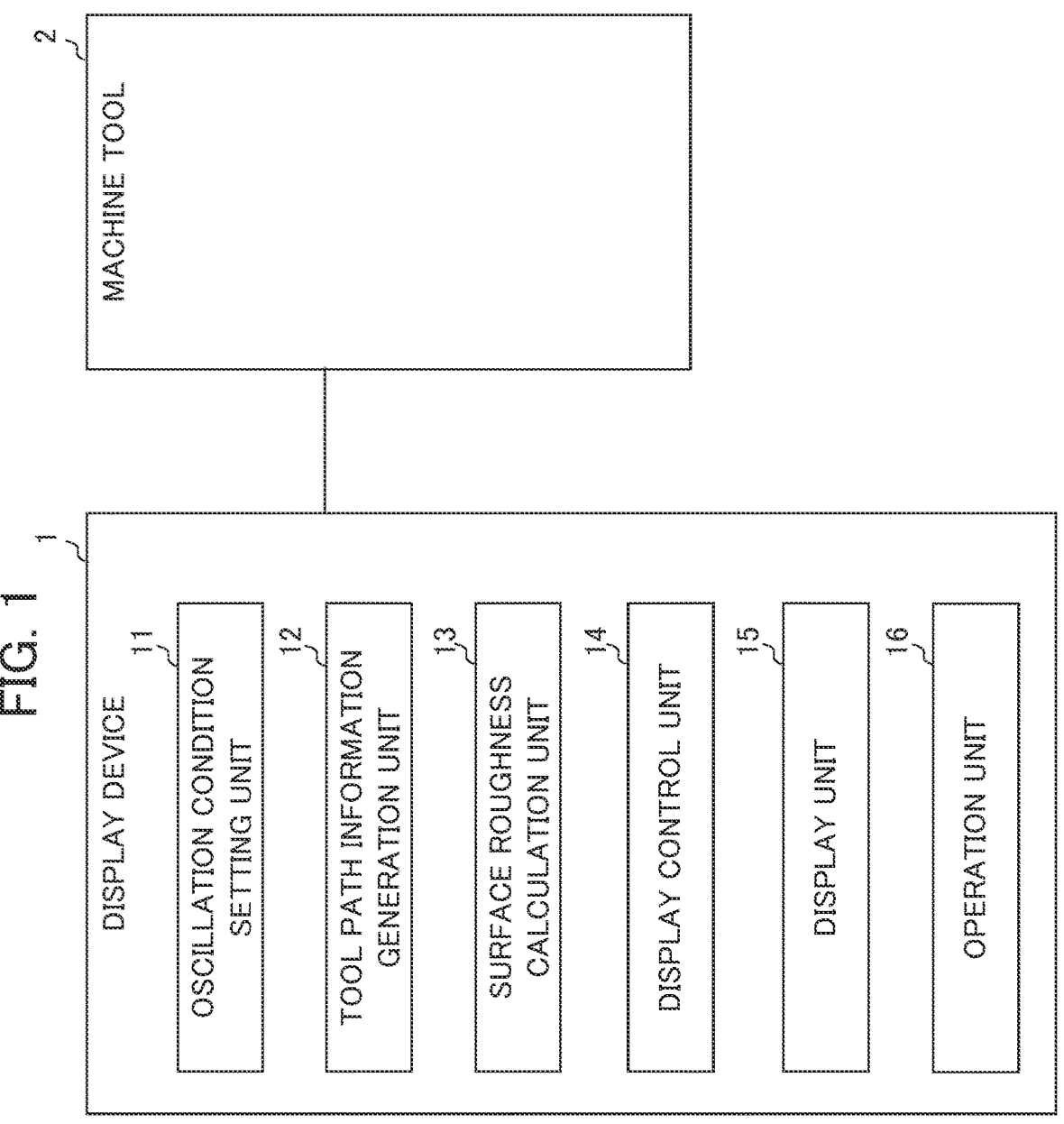
FIG. 1 is a diagram illustrating an outline of a display device according to an embodiment.

An example of embodiments of the present invention will be described below. FIG. 1 is a diagram illustrating an outline of a display device 1 according to the present embodiment. For example, as illustrated in FIG. 1, the display device 1 may be a numerical control device connected to a machine tool 2, or may be a computer device having a servo guide and connected to a numerical control device.

The machine tool 2 is a device for performing turning on a workpiece, and is directly or indirectly connected to the display device 1. Specifically, the machine tool 2 is for performing oscillation-cutting on a workpiece, and is directly or indirectly connected to the display device 1. The machine tool 2 has a commonly employed configuration adapted for performing oscillation-cutting and including a tool, a spindle, a feed shaft, etc.

In the following description of the present embodiment, the machine tool 2 for performing oscillation-cutting will be described. However, the machine tool 2 is not limited to such a device for performing oscillation-cutting, and may be a device for performing other types of turning.

The display device 1 includes an oscillation condition setting unit 11, a tool path information generation unit 12, a surface roughness calculation unit 13, a display control unit 14, a display unit 15, and an operation unit 16.

The oscillation condition setting unit 11 sets oscillation conditions (e.g., a spindle rotation number, a spindle feed amount, an oscillation frequency, an oscillation amplitude, etc.) for performing oscillation-cutting in which a workpiece and a tool are relatively vibrated based on, for example, a machining program and machining conditions.

The tool path information generation unit 12 generates tool path information regarding a tool path, based on the oscillation conditions set by the oscillation condition setting unit 11. The tool path information generation unit 12 generates the tool path information from, for example, a simulation of a command value of a machining program. The tool path information generation unit 12 may operate the machine tool 2 and generate tool path information from feedback from the machine tool 2. Here, the tool path information includes information regarding a spindle angle, a feed shaft position, a feed amount per rotation, etc., based on which a tool path is displayed on the display unit 15.

The surface roughness calculation unit 13 calculates, for turning in which a relative cutting feed speed between the workpiece and the tool changes, data regarding surface roughness of the workpiece based on a feed speed along a relative cutting feed direction for the workpiece and the tool and the shape of the tool.

Here, calculating the data regarding the surface roughness of the workpiece includes, for example, at least one of the following: calculating surface roughness at an arbitrary position on the workpiece; calculating average surface roughness from surface roughness calculated at a plurality of positions located in the circumferential direction of the workpiece; or calculating an evaluation index indicating variation in surface roughness calculated at a plurality of positions located in the circumferential direction of the workpiece.

Specifically, for turning in which a relative cutting feed speed between the workpiece and the tool changes, the surface roughness calculation unit 13 calculates a shape that the workpiece will have after being subjected to machining by the tool, based on the tool path generated by the tool path information generation unit 12 and the shape of the tool. Subsequently, the surface roughness calculation unit 13 calculates the surface roughness from coordinates of a group of points on the surface of the machined workpiece, using a generally-known definition formula for surface roughness.

The display control unit 14 controls and causes the display unit 15 to display data regarding the surface roughness of at an arbitrary position on the workpiece, based on the calculated data regarding the surface roughness of the workpiece and a preset display setting. Here, the display setting indicates a manner in which the data regarding the calculated surface roughness of the workpiece is displayed on the display unit 15.

The display unit 15 is, for example, a liquid crystal display, an organic EL display, or the like. Under the control of the display control unit 14, the display unit 15 displays the above-described information regarding the surface roughness at an arbitrary position on the workpiece, etc.

The operation unit 16 may include physical operation keys and/or buttons, or may include a touch panel in which a display unit and an operation unit are integrated. The operation unit 16 may include both a touch panel and physical operation keys and/or buttons.

In particular, for oscillation-cutting, which is a type of the turning and in which a workpiece and a tool are relatively reciprocally vibrated, the display device 1 performs the following process.

For the oscillation-cutting, the oscillation condition setting unit 11 sets oscillation conditions including a feed speed and the shape of the tool. The tool path information generation unit 12 generates tool path information regarding a tool path, based on the oscillation conditions set by the oscillation condition setting unit 11. The surface roughness calculation unit 13 calculates data regarding surface roughness of the workpiece based on the oscillation conditions set by the oscillation condition setting unit 11 and the tool path information generated by the tool path information generation unit 12.

The display control unit 14 controls and causes the display unit 15 to display data regarding surface roughness at an arbitrary position on the workpiece, based on the calculated data regarding the surface roughness of the workpiece and a preset display setting. By way of the control described above, for the oscillation-cutting, the display device 1 can calculate data regarding the surface roughness of the workpiece and display the data regarding the surface roughness of the workpiece on the display unit 15.

The display control unit 14 designates a phase of a rotating workpiece at an arbitrary position, and thereby displays a numerical value of the surface roughness at the designated arbitrary position on the workpiece and a surface roughness shape representing the surface roughness at the designated arbitrary position on a machined surface that the workpiece will have. Designating the arbitrary position may include designating a length direction of the workpiece together with a phase of the workpiece, and may further include designating a range to be used for the calculation of the surface roughness (a distance over which the surface roughness is measured).

Further, the display control unit 14 highlights the value of the surface roughness at the arbitrary position on the workpiece, based on the calculated data regarding the surface roughness of the workpiece and the preset display setting. Specifically, when the calculated surface roughness of the workpiece is equal to or greater than a certain value (for example, the surface roughness is greater than a standard value), the display control unit 14 may highlight the value of the surface roughness at the arbitrary position on the workpiece in red.

Figure 2:
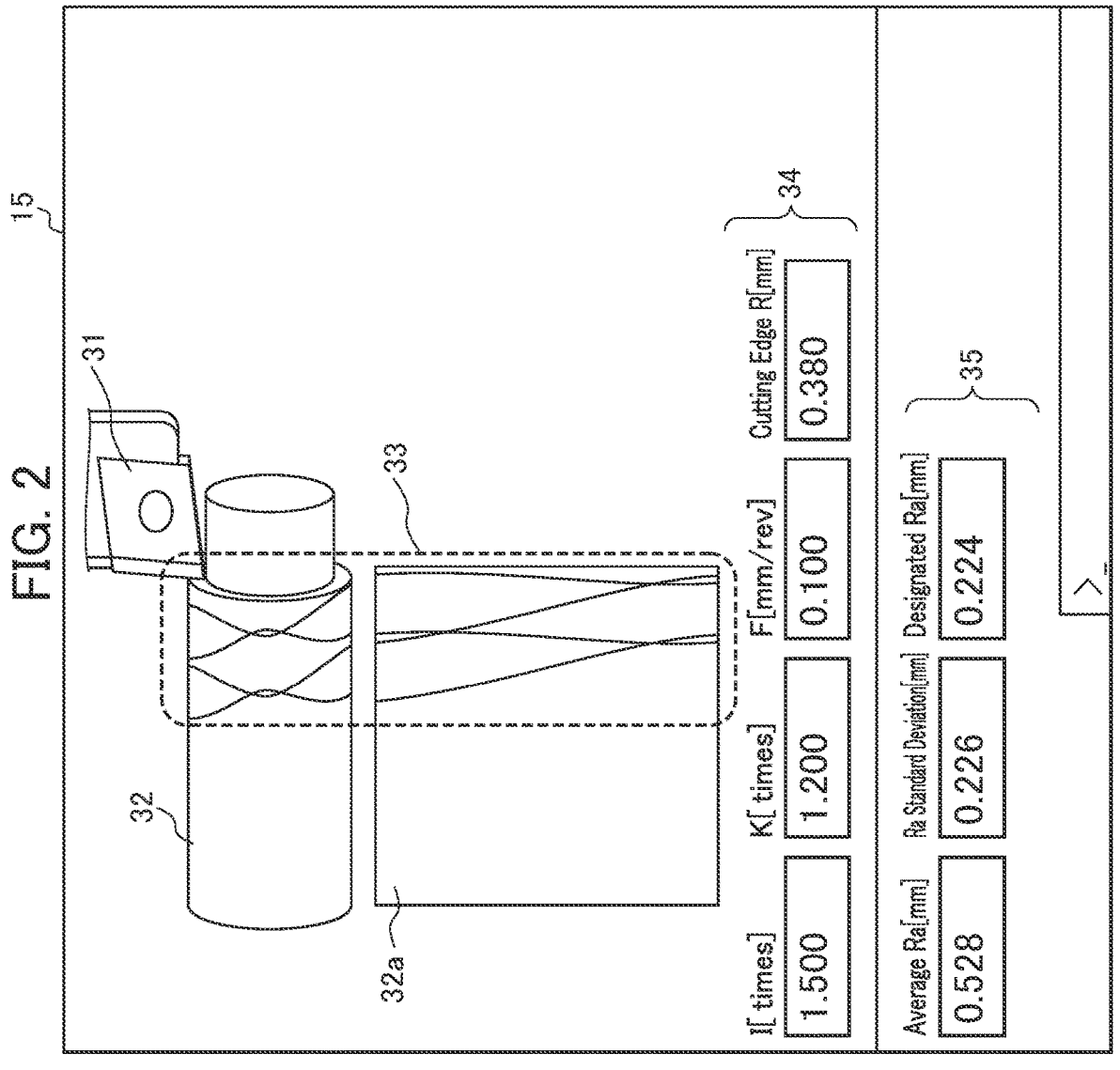
FIG. 2 is a diagram illustrating an example of data regarding surface roughness of a workpiece and displayed by the display device according to the embodiment.
Figure 3:
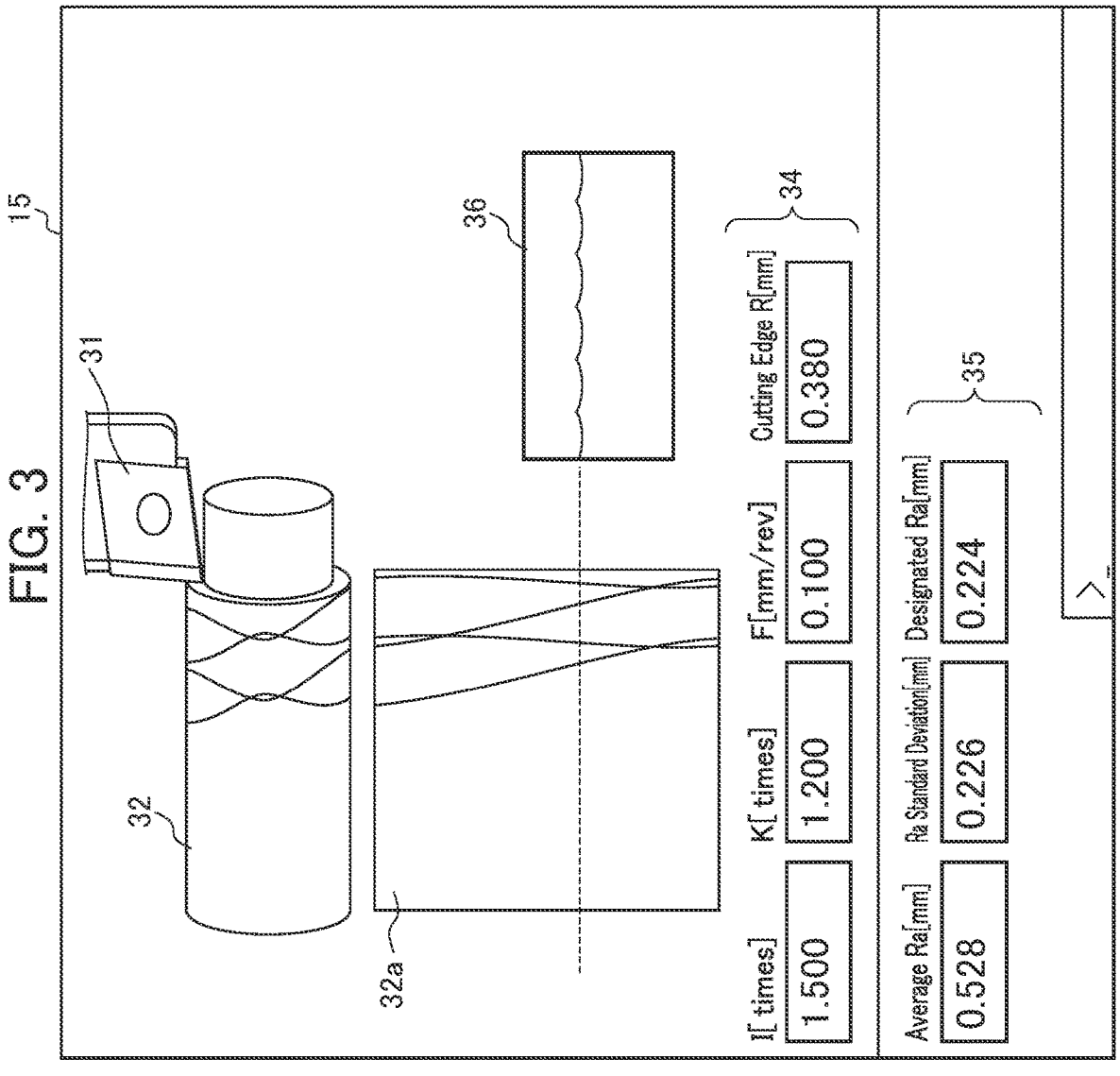
FIG. 3 is a diagram illustrating an example of data regarding surface roughness of the workpiece and displayed by the display device according to the embodiment.
Figure 4:
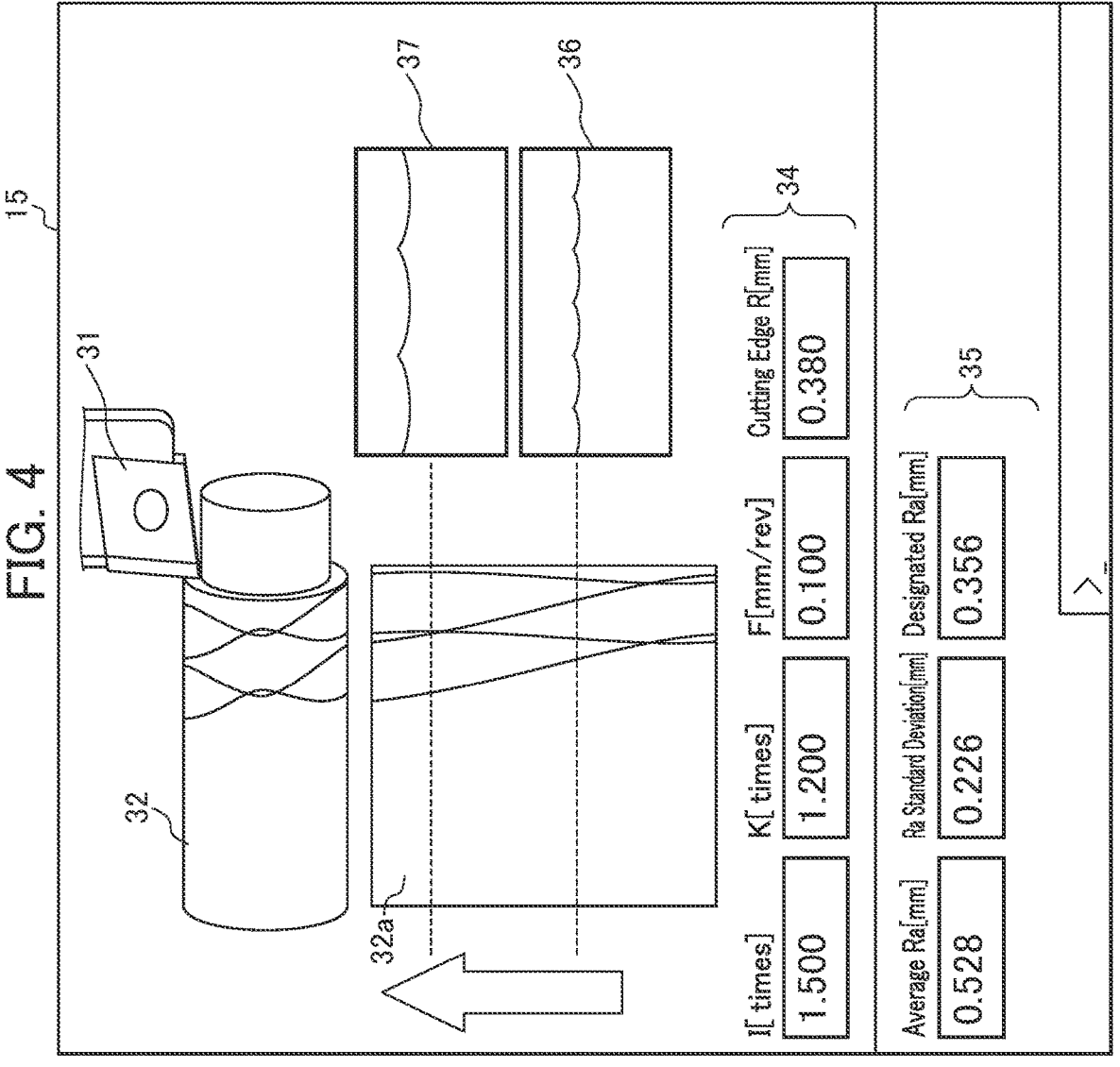
FIG. 4 a diagram illustrating an example of data regarding surface roughness of the workpiece and displayed by the display device according to the embodiment.

FIGS. 2 to 4 are diagrams each illustrating an example of data regarding surface roughness of a workpiece, which is displayable by the display device 1 according to the present embodiment. As illustrated in FIGS. 2 to 4, the display control unit 14 displays, on the display unit 15, a tool model 31 of a tool of the machine tool 2, a workpiece model 32 of a workpiece machinable by the machine tool 2, and a tool path 33. The workpiece model 32 is subjected to oscillation-cutting performed by the tool model 31 while rotating around the central axis. Here, the tool path 33 is displayed on not only the workpiece model 32 but also on a model 32*a* that two-dimensionally represents the workpiece.

The display control unit 14 further displays, on the display unit 15, machining condition data 34 regarding machining conditions and surface roughness data 35 regarding surface roughness. Here, the machining condition data 34 includes an oscillation frequency multiplying factor I [times], an oscillation amplitude multiplying factor K [times], a feed speed F [mm/rev], and a corner radius R [mm] of a cutting edge.

The oscillation frequency multiplying factor I [times], the oscillation amplitude multiplying factor K [times], the feed speed F [mm/rev], and the corner radius R [mm] of the cutting edge are parameters included in the oscillation conditions or the machining conditions. The corner radius R is inputted to the display device 1 by a user using the operation unit 16.

The surface roughness data 35 includes an average value [mm] of the surface roughness Ra, a standard deviation [mm] of the surface roughness Ra, and a designated-position surface roughness Ra [mm] at a designated position on the workpiece. The average value of the surface roughness Ra represents an average of values of the surface roughness Ra at phases over a perimeter of the workpiece. The standard deviation of the surface roughness Ra represents a standard deviation of the values of the surface roughness Ra at phases over the perimeter of the workpiece. Here, the surface roughness data 35 is obtained by, for example, calculating surface roughness at intervals of 10° over the workpiece's phases from 0° to 360° and then calculating the average value or standard deviation of the calculated surface roughness values.

In response to setting of the oscillation conditions by the oscillation condition setting unit 11, the surface roughness data 35 is calculated by the surface roughness calculation unit 13 based on the oscillation conditions set by the oscillation condition setting unit 11 and the tool path information generated by the tool path information generation unit 12.

As illustrated in FIG. 3, the display control unit 14 further displays, on the display unit 15, a surface roughness shape 36 representing surface roughness at a first designated position on the workpiece. The displayed surface roughness shape 36 is a shape viewed in cross section and represents the surface roughness of the workpiece at a location indicated by a broken line on the model 32a, which two-dimensionally represents the workpiece.

As illustrated in FIG. 4, the display control unit 14 further displays, on the display unit 15, a surface roughness shape 37 representing surface roughness at a second designated position on the workpiece. The displayed surface roughness shape 37 is a shape viewed in cross section and represents the surface roughness of the workpiece at a location indicated by a broken line on the model 32a, which two-dimensionally represents the workpiece.

The display control unit 14 designates a phase of the workpiece in response to the user moving up and down a cursor displayed on the display unit 15 using keys constituting the operation unit 16 or in response to the user inputting numerical values using keys constituting the operation unit 16.

By designating the phase of the workpiece, the display control unit 14 displays the designated-position surface roughness Ra forming part of the surface roughness data 35 and relating to the surface roughness at the phase, and displays the surface roughness shape 36 or 37 of a machined surface that the workpiece will have at the phase.

That is, the user of the display device 1 can switchably change the designated-position surface roughness Ra forming part of the surface roughness data 35 by operating the operation unit 16. Furthermore, the user of the display device 1 can switch between the surface roughness shapes 36 and 37 of the workpiece to be displayed, by operating the operation unit 16.

FIG. 5 is a flowchart illustrating a flow of process performed by the display device 1 according to the present embodiment. In Step S1, the oscillation condition setting unit 11 sets oscillation conditions for performing oscillation-cutting in which a workpiece and a tool are relatively vibrated, based on a machining program, machining conditions, etc.

In Step S2, the tool path information generation unit 12 generates tool path information regarding a tool path based on the oscillation conditions set by the oscillation condition setting unit 11.

In Step S3, the surface roughness calculation unit 13 calculates data regarding surface roughness of the workpiece based on the oscillation conditions set by the oscillation condition setting unit 11 and the tool path information generated by the tool path information generation unit 12.

In Step S4, the display control unit 14 controls and causes the display unit 15 to display data regarding surface roughness at an arbitrary position on the workpiece, based on the calculated data regarding the surface roughness of the workpiece and a preset display setting.

As described above, the display device 1 according to the present embodiment includes the surface roughness calculation unit 13 that calculates, for the turning in which a relative cutting feed speed between a workpiece and a tool changes, data regarding the surface roughness of the workpiece based on a feed speed along a relative cutting feed direction for the workpiece and the tool and the shape of the tool, and the display control unit 14 that controls and causes the display unit 15 to display data regarding surface roughness at an arbitrary position on the workpiece, based on the calculated data regarding the surface roughness and a preset display setting.

Due to this feature, the display device 1 allows the data regarding the surface roughness of the workpiece to be easily checked for the turning, and the user of the display device 1 can use the data regarding the surface roughness of the workpiece in discussing machining conditions and a machining method for improving the quality of the machining.

The display device 1 according to the present embodiment further includes the oscillation condition setting unit 11 that sets, for the oscillation-cutting which is a type of the turning and in which the workpiece and the tool are relatively reciprocally vibrated, oscillation conditions including the feed speed and the shape of the tool, and the tool path information generation unit 12 that generates tool path information regarding a tool path based on the oscillation conditions. The surface roughness calculation unit 13 calculates data regarding the surface roughness based on the oscillation conditions and the tool path information.

This feature makes it possible for the user of the display device 1 to easily check the data regarding the surface roughness of the workpiece for the oscillation-cutting and to use the data regarding the surface roughness of the workpiece in discussing machining conditions and a machining method for improving the quality of the machining.

The display control unit 14 designates a phase of the workpiece at an arbitrary position to thereby display a numerical value of the surface roughness at the designated arbitrary position, and displays a shape representing the surface roughness at the designated arbitrary position of a machined surface that the workpiece will have. This feature allows the user of the display device 1 to easily check the numerical value of the surface roughness of the workpiece and the shape representing the surface roughness.

While one embodiment of the present invention has been described in the foregoing, the display device 1 can be implemented by hardware, software, or a combination thereof. The control method performed by the display device 1 can also be implemented by hardware, software, or a combination thereof. Here, the implementation by software means that a computer reads and executes a program for the implementation.

The program can be stored in various types of non-transitory computer readable media and can be provided to a computer. The non-transitory computer readable media include various types of tangible storage media. Examples of non-transitory computer readable media include magnetic recording media (e.g., a hard disk drive), magnetic-optical recording media (e.g., a magnetic-optical disk), a read only memory (CD-ROM), a CD-R, a CD-R/W, and a semiconductor memory (e.g., a mask ROM, a programmable ROM (PROM), an erasable PROM (EPROM), a flash ROM, and a random access memory (RAM)). In the above-described embodiment, the index of the surface roughness is not limited to the arithmetic average roughness, and other commonly known indexes of the surface roughness, such as the maximum height Rz, can be applied. Furthermore, as the evaluation index indicating variation, a relative evaluation index indicating a degree of dispersion or a degree of variation defined in advance may be used in addition to the standard deviation.

Although the above-described embodiment is a preferred embodiment of the present invention, the scope of the present invention is not limited to the above-described embodiment. Various modifications can be made without departing from the spirit of the present invention.

EXPLANATION OF REFERENCE NUMERALS

1: Display device
2: Machine tool
11: Oscillation condition setting unit
12: Tool path information generation unit
13: Surface roughness calculation unit
14: Display control unit
15: Display unit
16: Operation unit

The invention claimed is:

1. A display device comprising:

a processor, wherein the processor is configured to:

generate tool path information regarding a tool path, for turning in which a relative cutting feed speed between a workpiece and a tool changes, calculate data regarding surface roughness of the workpiece, based on a feed speed along a relative cutting feed direction for the workpiece and the tool and a shape of the tool; and control and cause a display unit to display data regarding the surface roughness of the workpiece, based on the calculated data regarding the surface roughness and a preset display setting, wherein the processor calculates data regarding surface roughness of the workpiece based on the tool path information, wherein the processor displays data regarding surface roughness of the workpiece at designated arbitrary phase, wherein designating the arbitrary phase includes designating a length direction of the workpiece together with a phase of the workpiece and/or designating a distance over which the surface roughness is measured as a range to be used for the calculation of the surface roughness.

2. The display device according to claim 1, wherein the processor sets, for oscillation-cutting which is a type of the turning and in which the workpiece and the tool are relatively reciprocally vibrated, oscillation conditions including the feed speed and the shape of the tool, wherein the processor the calculates data regarding the surface roughness based on the oscillation conditions and the tool path information.

3. The display device according to claim 2, wherein the processor highlights a value of the surface roughness at an arbitrary position on the workpiece based on the calculated data regarding the surface roughness of the workpiece and the preset display setting.

4. A non-transitory computer-readable storage medium storing a program that is executed by a computer that comprises a processor of a display device, the program being executable to cause the computer to perform operations comprising:

generating tool path information regarding a tool path, for turning in which a relative cutting feed speed between a workpiece and a tool changes;

calculating data regarding surface roughness of the workpiece, based on a feed speed along a relative cutting feed direction for the workpiece and the tool and a shape of the tool; and controlling and causing a display unit to display data regarding the surface roughness at an arbitrary designated position on the workpiece, based on the calculated data regarding the surface roughness and a preset display setting, wherein calculating data regarding surface roughness of the workpiece includes calculating data regarding surface roughness of the workpiece based on the tool path information, wherein controlling and causing the display unit to display data regarding the surface roughness includes displaying data regarding surface roughness of the workpiece at designated arbitrary phase, wherein designating the arbitrary phase includes designating a length direction of the workpiece together with a phase of the workpiece and/or designating a distance over which the surface roughness is measured as a range to be used for the calculation of the surface roughness.

* * * * *